United States Patent
Kievits et al.

(10) Patent No.: US 8,069,335 B2
(45) Date of Patent: Nov. 29, 2011

(54) PROCESSING SYSTEM AND METHOD FOR EXECUTING INSTRUCTIONS

(75) Inventors: Peter Kievits, Waalre (NL); Jean-Paul C. F. H. Smeets, Eindhoven (NL)

(73) Assignee: NXP B.V., Eindhoven (NL)

( * ) Notice: Subject to any disclaimer, the term of this patent is extended or adjusted under 35 U.S.C. 154(b) by 446 days.

(21) Appl. No.: 12/093,643

(22) PCT Filed: Nov. 13, 2006

(86) PCT No.: PCT/IB2006/054209
§ 371 (c)(1),
(2), (4) Date: May 14, 2008

(87) PCT Pub. No.: WO2007/057828
PCT Pub. Date: May 24, 2007

(65) Prior Publication Data
US 2008/0256334 A1    Oct. 16, 2008

(30) Foreign Application Priority Data
Nov. 15, 2005   (EP) .................... 05110764

(51) Int. Cl.
*G06F 15/76* (2006.01)
*G06F 9/318* (2006.01)
(52) U.S. Cl. .................... 712/205; 712/24
(58) Field of Classification Search .......... 712/24, 712/205
See application file for complete search history.

(56) References Cited

U.S. PATENT DOCUMENTS

| | | | |
|---|---|---|---|
| 5,179,680 A | 1/1993 | Colwell et al. | |
| 5,724,535 A | 3/1998 | Woudsma et al. | |
| 5,893,143 A * | 4/1999 | Tanaka et al. | 711/120 |
| 5,930,508 A | 7/1999 | Faraboschi et al. | |
| 6,275,921 B1 * | 8/2001 | Iwata et al. | 712/24 |
| 2001/0047466 A1 * | 11/2001 | Topham | 712/226 |
| 2003/0079109 A1 | 4/2003 | Pechanek et al. | |

OTHER PUBLICATIONS

Kievits, Peter; et al "R.E.A.L. DSP Technology for Telecom Baseband Processing" ICSPAT Conference, 1998.

* cited by examiner

*Primary Examiner* — Daniel Pan

(57) ABSTRACT

A processing system for executing instructions comprises a first part (11) having address information and a plurality of data bits, $E_0$ to $E_N$. According to one embodiment, each data bit $E_0$ to $E_N$ directly selects a corresponding element $13_0$ to $13_N$ forming a second part of the instruction set (for example a VLIW). In this manner, the first part (11) is used to only select elements that do not comprise NOP instructions, thereby avoiding power being consumed unnecessarily. According to an alternative embodiment, different groups of elements in the second part (13) may be selected by a number encoded in the first part (11), using data bits $E_o$ to $E_N$. Preferably, these different groups reflect the most likely used combinations in a program.

12 Claims, 4 Drawing Sheets

PROCESSING SYSTEM AND METHOD FOR EXECUTING INSTRUCTIONS

The invention relates to a processing system and method for executing instructions, and in particular to a processing system and method that have power reduction advantages for instructions that are fetched in two or more parts.

The invention further relates to a device, such as a mobile phone, PDA or alike, comprising such processing system.

Power efficiency for processor based equipment is becoming increasingly important, particularly in battery-operated equipment. A number of techniques have been used to reduce power usage. These include designing the circuitry of a processor to use less power, or designing the processor in a manner which allows power usage to be managed. Also, for a given processor architecture, power consumption can be saved by optimizing its programming.

When designing a processor architecture and an associated instruction set for the processor architecture, a trade-off can be made between the number of bits that are needed to describe instruction level parallelism, and the number of bits that can be fetched in parallel from the program memory.

In some processor architectures, a cycle penalty can occur if instructions exceed a given length. Therefore, some processor architectures use instruction compression. However, if compression of instructions is too expensive, then an alternative can be to use two types of program memory: one for small instructions with limited parallelism, and a second one for wide instructions with greater parallelism. To indicate that a wide instruction should be fetched, a special small instruction, i.e. a first part, is used to trigger a fetch to the wide instruction, i.e. a second part.

An example of such a system is disclosed in U.S. Pat. No. 5,724,535, in which a mechanism is described in which instructions in program memory are expanded to VLIW (Very Long Instruction Word) instructions by performing a lookup in a second memory.

FIG. 1 shows an example of such a VLIW processor 1, which is characterized by its ability to process multiple instructions in parallel using different functional units $3_0$ to $3_n$ within the processor. A VLIW instruction stored in a second memory 5 comprises a number of elements, each of which controls a respective functional unit $3_0$ to $3_n$ within the processor 1. During operation, the addresses for the second memory 5 are derived from instructions in a main memory program 7. A decoder 9 is provided for detecting the specific instructions from the main program memory 7 which require a lookup into the second memory 5.

FIG. 2 shows how an instruction, i.e. first part 11, in the main memory 7 provides address information for the VLIW instruction, i.e. second part 13, stored in the second memory 5. The VLIW instruction 13 contains a plurality of elements $13_0$ to $13_N$. A more detailed aspect of this method of processing instructions can be found in a paper by P Kievits, et al, "R.E.A.L. DSP Technology for Telecom Baseband Processing", ICSPAT conference, 1998.

In this way VLIW instructions can be output in parallel to the respective functional units $3_0$ to $3_n$ of FIG. 1. It is rare to have fully parallel operation in which all functional units are used at each processing cycle. More commonly, many VLIW instructions contain NOP (No Operation) instructions in several of the sub-elements, indicating that the corresponding functional unit is not operated during that processing cycle.

Thus, if no compression is used, then the parallelism allowed by the second part might not always be fully exploited, since elements $13_0$ to $13_N$ of the second part will contain NOPs (i.e. No Operations). In the prior art, the second part is completely fetched from memory, even those elements of the instruction that contain NOPs. This has the disadvantage of consuming more power than is needed.

The aim of the invention is to provide a processing system and method in which the unnecessary power consumption associated with fetching NOPs is avoided.

According to a first aspect of the invention, there is provided a method of executing instructions in a processor in which a first part of an instruction causes execution of a second part of an instruction, and wherein the second part comprises a plurality of elements. The method comprises the steps of fetching a first part of the instruction, and identifying from first information encoded in the first part of the instruction which elements constitute the second part of the instruction. The method also comprises the step of identifying from second information encoded in the first part of the instruction which of the identified elements correspond to no-operation, NOP instructions. Elements that form the second part of the instruction are then fetched, excluding the elements which correspond to no-operation, NOP, instructions.

The invention solves the above mentioned power problem by indicating in the first part which elements of the second part should be fetched. Thus, the invention has the advantage that power can be saved by fetching only those elements of the second part that do not contain a NOP.

According to another aspect of the invention, there is provided a processing system for executing instructions, wherein a first part of an instruction causes execution of a second part of an instruction. The system comprises means for fetching a first part of the instruction, and means for identifying from first information contained in the first part of the instruction which elements constitute the second part of the instruction. The system also comprises means for identifying from second information encoded in the first part of the instruction which of the identified elements correspond to no-operation, NOP instructions, and means for fetching the elements that form the second part of the instruction. The means for fetching is adapted to exclude the elements which correspond to no-operation, NOP, instructions.

According to another aspect of the invention, there is provided an instruction for use in a data processing system, the instruction comprising a first part that causes execution of a second part having a plurality of elements, wherein the first part of the instruction comprises a plurality of data bits, the plurality of data bits identifying no-operation, NOP, instructions that are to be excluded from execution in the second part.

For a better understanding of the present invention, and to show more clearly how it may be carried into effect, reference will now be made, by way of example only, to the following drawings in which.

Figure 1:
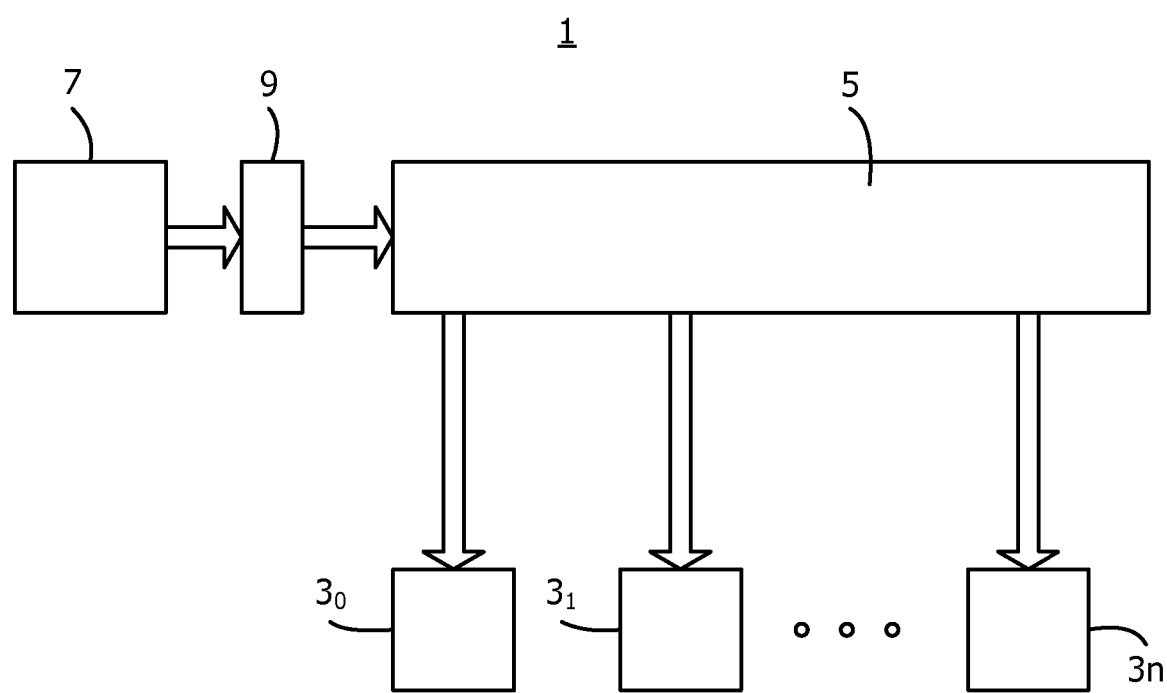
FIG. 1 shows an illustration of a known processing architecture.
Figure 2:
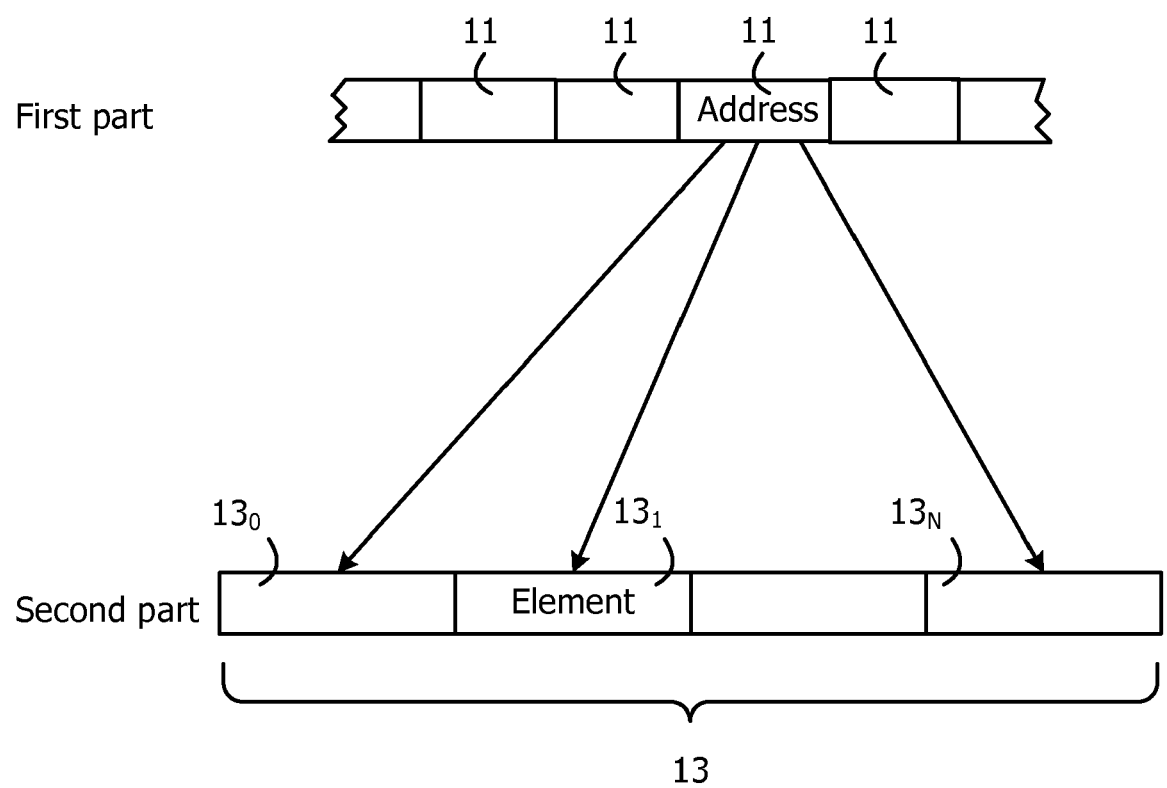
FIG. 2 shows an illustration of how a VLIW instruction is fetched in two parts.
Figure 3:
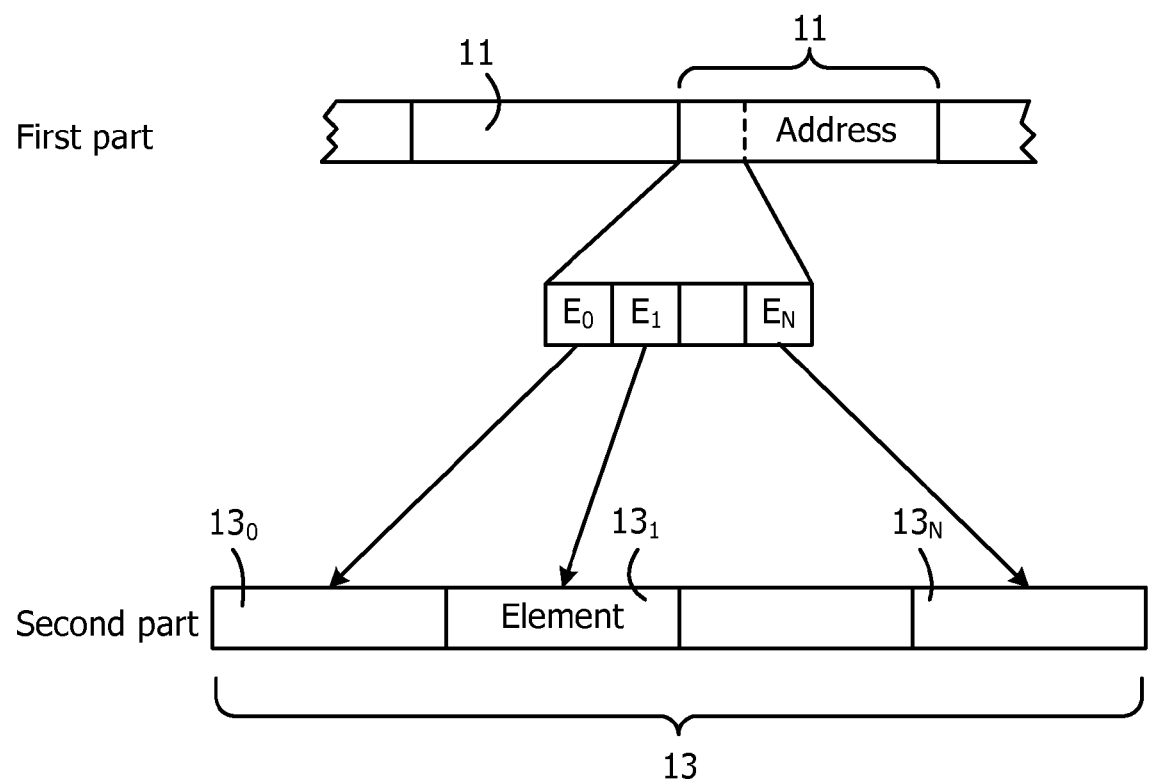
FIG. 3 shows an illustration of how instructions are executed according to a first embodiment of the present invention.

FIG. 3 shows a processing system according to the present invention. Each instruction in the instruction encoding scheme comprises a first part 11. However, in addition to containing address information (first information) for a second part 13, the first part 11 also comprises other information (second information) in the form of a plurality of data bits, $E_0$ to $E_N$. It will be appreciated that these data bits $E_0$ to $E_N$ are in addition to the main data bits forming an instruction in the first part of the instruction set, which are stored in the main program memory 7.

According to a first embodiment of the invention, each data bit $E_0$ to $E_N$ directly selects a corresponding element $13_0$ to $13_N$ in the second part 13 of the instruction set. The elements $13_0$ to $13_N$ in the second part 13 of the instruction set may form, for example, a VLIW. In this manner, the data bits $E_0$ to $E_N$ of the first part 11 are used to only select elements that do not comprise NOP instructions, thereby avoiding power being consumed unnecessarily. In other words, information encoded in the data bits $E_0$ to $E_N$ is effectively used to identify which elements correspond to NOP instructions, by only selecting elements that exclude NOP instructions.

Thus, according to the invention, an instruction 11 in the main program memory 7 contains a plurality of data bits $E_0$ to $E_N$ that indicate which elements of the VLIW should be fetched from the second memory 5. Since the second memory 5 is split into a plurality of elements, each element relating to a part of the VLIW that corresponds to a functional unit in the processor, the invention results in each element having a separate enable signal controlled by a corresponding one of the plurality of data bits $E_0$ to $E_N$.

For example, if the VLIW stored in the second memory comprises 8 elements $13_0$ to $13_7$, then the instruction word in the main program memory will comprise 8 data bits, $E_0$ to $E_7$. According to the first embodiment of the invention, if there are no NOP instructions in any of the elements of the VLIW, then each of the data bits $E_0$ to $E_7$ can be set to the same logic state, for example "high", to enable each of the elements. In this circumstance, each element will be passed to a corresponding functional unit $3_0$ to $3_n$ in the processor for execution.

However, if an element in the VLIW contains a NOP instruction, for example the fourth element 13_3, then a corresponding one of the plurality of data bits ($E_3$) will be held "low", thereby disabling the fourth element from being passed to its corresponding functional unit ($3_3$) for execution. In this way, power is saved because the functional unit corresponding to the fourth element $13_3$ is effectively disabled from processing any instruction.

It will be appreciated that while the embodiment described above refers to a logic "high" acting to enable a corresponding element and a logic "low" acting to disable a corresponding element, the reverse logic could also be used.

Thus, as can be seen from FIG. 3, each first part 11 requires "N" data bits, one for each of the elements in the second part 13.

Figure 4:
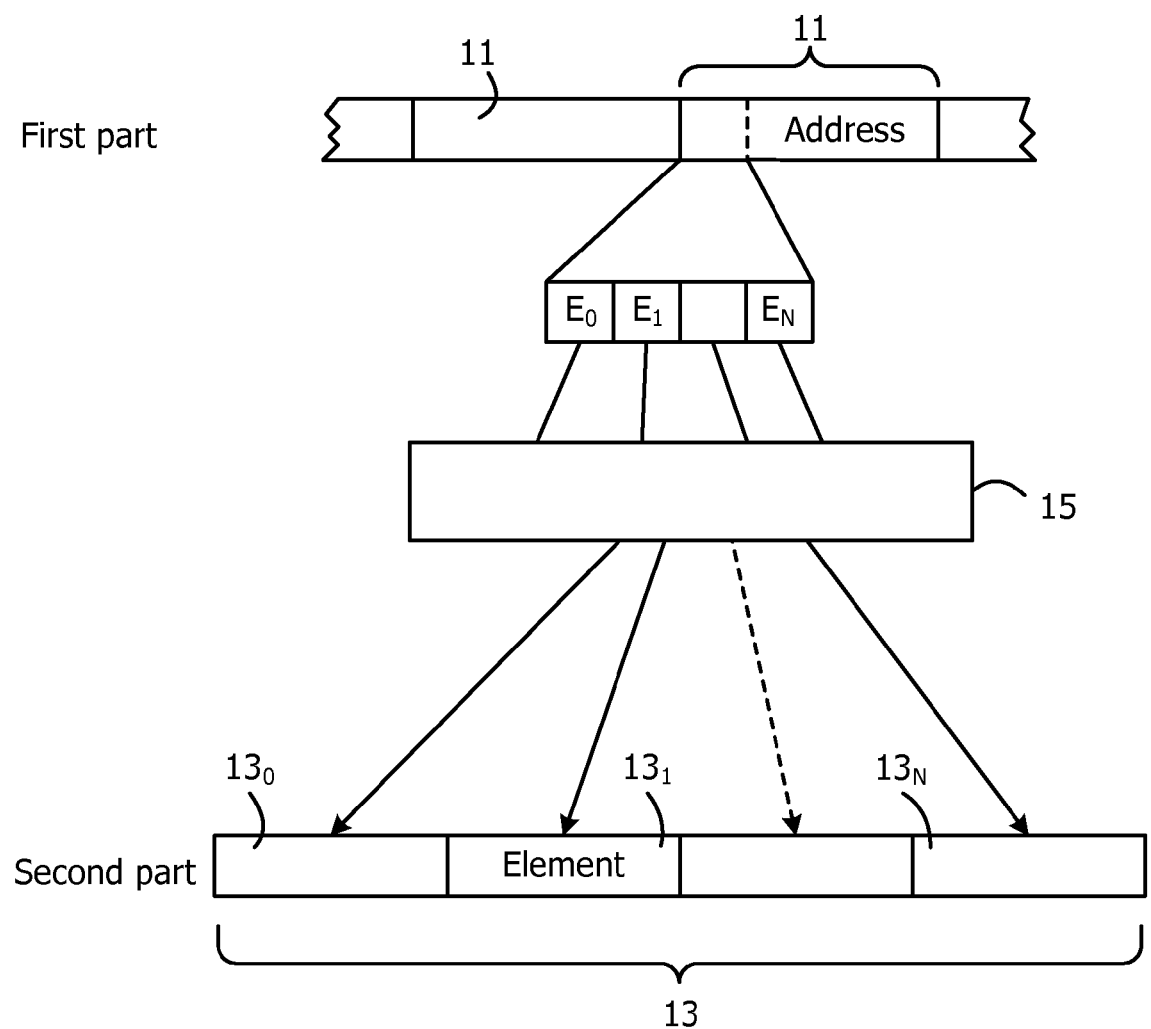
FIG. 4 shows an illustration of how instructions are executed according to a second embodiment of the present invention.

FIG. 4 shows an alternative embodiment of the invention. According to this embodiment, different groups of elements in the second part 13 may be selected by a number encoded in the first part 11, using the data bits $E_0$ to $E_N$. The group of elements is selected using a decoding stage 15. Preferably, these different groups reflect the groups which are most frequently used during program execution. For example, 16 or 32 groups could be defined, each of which has a combination of NOPs which occurs on a frequent basis. The decoding stage 15 is then configured to determine in which group a particular instruction belongs.

For example, one group could comprise "element 1, element 2, element 5, element 7", another group could comprise "element 1, element 6, element 9, element 10" and so on, with each combination of elements in a particular group representing a combination that is commonly used in a program.

In the second embodiment, a first part 11 comprising four data bits $E_0$ to $E_3$ can be used to encode 16 different second parts, while a first part comprising eight data bits $E_0$ to $E_7$ can be used to encode 256 different second parts, and so on.

It is noted that not all instructions 11 in the first and second embodiments necessarily have a corresponding second part 13. In other words, certain instructions with limited parallelism might comprise just a first part 11, without an associated second part 13. In this way, if there is very limited parallelism in an instruction, efficiency is improved by encoding the instruction completely in the first part.

Also, while the preferred embodiment has been described in terms of an instruction fetched in first and second parts, it will be appreciated that the invention is equally applicable to instructions fetched in more than two parts.

It is noted that the invention is particularly suited for use in applications within battery driven devices that require a high computing performance.

As will be appreciated by a person skilled in the art, the "elements" described in the above mentioned embodiments can be individual instructions for each respective functional unit, or part of an instruction for a functional unit. It is also possible that more than one functional unit responds to a single instruction of more than one element. For example, a data move from memory to a register in a functional unit might require a register destination selection and a pointer unit to generate a data address. This could be encoded in more than one element.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method of executing instructions in a processor in which a first part of an instruction causes execution of a second part of an instruction, and wherein the second part comprises a plurality of elements, the method comprising the steps of:
   fetching a first part of the instruction;
   identifying from first information encoded in the first part of the instruction which elements constitute the second part of the instruction;
   identifying from second information encoded in the first part of the instruction which of the identified elements correspond to no-operation, NOP instructions; and
   fetching the elements that form the second part of the instruction, excluding the elements which are identified by the second information as corresponding to no-operation, NOP, instructions.

2. A method as claimed in claim 1, wherein the second information encoded in the first part comprises a plurality of data bits, each data bit providing information for selecting an associated element of the second part of the instruction.

3. A method as claimed in claim 1, wherein the second information encoded in the first part comprises a plurality of data bits, the data bits in combination representing an associated group of elements forming the second part of the instruction.

4. A method as claimed in claim 3, wherein each group of elements in the second part relates to a group of elements that is frequently used during program execution.

5. A method as claimed in claim 1, wherein the second part is a very long instruction word, VLIW, each element in the VLIW forming an instruction for a functional element of a processor.

6. A method as claimed in claim 1, wherein the first part is stored in a first memory, and wherein the second part is stored in a second memory.

7. A processing system for executing instructions, wherein a first part of an instruction causes execution of a second part of an instruction, the system comprising:
- means for fetching a first part of the instruction;
- means for identifying from first information contained in the first part of the instruction which elements constitute the second part of the instruction;
- means for identifying from second information encoded in the first part of the instruction which of the identified elements correspond to no-operation, NOP instructions; and
- means for fetching the elements that form the second part of the instruction, the means for fetching being adapted to exclude the elements which are identified by the second information as corresponding to no-operation, NOP, instructions.

8. A system as claimed in claim 7, wherein the second information encoded in the first part comprises a plurality of data bits, and the means fetching is adapted to select an associated element of the second part of the instruction based on a corresponding data bit.

9. A system as claimed in claim 7, wherein the second information encoded in the first part comprises a plurality of data bits, and the means for fetching is adapted to select a group of elements forming the second part of the instruction, based on the plurality of data bits in the first part.

10. A system as claimed in claim 7, further comprising decode logic for selecting a group of elements forming the second part of the instruction.

11. A system as claimed in claim 7, wherein the second part is a very long instruction word, VLIW, each element of the VLIW forming an instruction for a functional element of a processor.

12. A system as claimed in claim 7, further comprising a first memory for storing the first part of the instruction, and a second memory for storing the second part of the instruction.

* * * * *